US009720702B2

United States Patent
Furtwangler et al.

(10) Patent No.: US 9,720,702 B2
(45) Date of Patent: Aug. 1, 2017

(54) OBJECT-ORIENTED PROGRAMMING SYSTEM AND LIBRARY

(71) Applicant: Home Box Office, Inc., New York, NY (US)

(72) Inventors: Brandon C. Furtwangler, Issaquah, WA (US); Tyler R. Furtwangler, Sammamish, WA (US); Nathan J. E. Furtwangler, Kirkland, WA (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

(21) Appl. No.: 14/843,916

(22) Filed: Sep. 2, 2015

(65) Prior Publication Data

US 2016/0070579 A1   Mar. 10, 2016

Related U.S. Application Data

(60) Provisional application No. 62/046,139, filed on Sep. 4, 2014.

(51) Int. Cl.
*G06F 9/44* (2006.01)
(52) U.S. Cl.
CPC ............ *G06F 9/4428* (2013.01); *G06F 8/315* (2013.01)
(58) Field of Classification Search
None
See application file for complete search history.

(56) References Cited

U.S. PATENT DOCUMENTS

| | | | | |
|---|---|---|---|---|
| 7,000,151 B2 * | 2/2006 | Dwyer | ................... | G06F 8/437 714/38.14 |
| 7,451,433 B2 * | 11/2008 | Halpern | ................... | G06F 8/71 717/106 |
| 7,730,467 B1 * | 6/2010 | Hejlsberg | ............ | G06F 17/2247 717/142 |
| 7,770,160 B2 * | 8/2010 | Ramani | ................... | G06F 8/44 717/143 |

(Continued)

OTHER PUBLICATIONS

Richards, Gregor, et al. "An analysis of the dynamic behavior of JavaScript programs." ACM Sigplan Notices. vol. 45. No. 6. ACM, 2010. Retrieved on [Mar. 17, 2017] Retrieved from the Internet: URL<http://dl.acm.org/citation.cfm?id=1806598>.*

(Continued)

*Primary Examiner* — Thuy Dao
*Assistant Examiner* — Cheneca Smith
(74) *Attorney, Agent, or Firm* — Amin, Turocy & Watson, LLP

(57) ABSTRACT

The described technology is directed towards an object-oriented programming (OOP) system and library that maps conventional object-oriented concepts such as class hierarchies, interfaces, and static methods and properties onto a prototypal object system such as JavaScript®. Various functions of the OOP system are called to create a class-like structure that is instantiated into an object instance upon request. The OOP system allows for use of a wrapper pattern to wrap selected objects with added functionality such as validation and tracing, and to provide enhanced functionality with respect to properties, such as to call a function associated with a property when the property's value changes, and/or to lazily generate property values only when accessed.

17 Claims, 10 Drawing Sheets

(56) References Cited

U.S. PATENT DOCUMENTS

| | | | | |
|---|---|---|---|---|
| 7,827,522 B2* | 11/2010 | Hussey | ................. | G06F 9/4428 717/105 |
| 7,992,130 B2* | 8/2011 | Bozza | ..................... | G06F 9/443 717/108 |
| 8,448,130 B1* | 5/2013 | Pillarisetti | ............... | G06F 8/447 717/104 |
| 2003/0056195 A1 | 3/2003 | Hunt | | |
| 2004/0015748 A1* | 1/2004 | Dwyer | .................... | G06F 8/437 714/52 |
| 2005/0119993 A1* | 6/2005 | Ramani | ............... | G06F 9/44521 |
| 2005/0183058 A1* | 8/2005 | Meijer | ................. | G06F 9/4425 717/100 |
| 2005/0262475 A1* | 11/2005 | Halpern | .................... | G06F 8/71 717/114 |
| 2005/0268243 A1* | 12/2005 | Moser | ....................... | G06F 8/38 715/760 |
| 2007/0226688 A1 | 9/2007 | Foti | | |
| 2008/0141219 A1* | 6/2008 | Chinnici | ............... | G06F 9/4433 717/116 |
| 2008/0282260 A1* | 11/2008 | Bozza | ..................... | G06F 9/443 719/315 |
| 2012/0084750 A1* | 4/2012 | Hardy | ...................... | G06F 8/24 717/115 |
| 2014/0380276 A1* | 12/2014 | Matthiesen | ............... | G06F 8/75 717/123 |

OTHER PUBLICATIONS

Van Cutsem et al. "Proxies: design principles for robust object-oriented intercession APIs." ACM Sigplan Notices. vol. 45. No. 12. ACM, 2010. Retrieved on [Mar. 17, 2017] Retrieved from the Internet: URL<http://dl.acm.org/citation.cfm?id=1869638>.*

International Search Report and Written opinion from International Patent Application Serial No. PCT/US15/48389, Dated Dec. 10, 2015, 12 pages.

* cited by examiner

OBJECT-ORIENTED PROGRAMMING SYSTEM AND LIBRARY

CROSS-REFERENCE TO RELATED APPLICATION

The present application claims priority to U.S. provisional patent application Ser. No. 62/046,139, filed Sep. 4, 2014, the entirety of which is incorporated herein by reference.

COPYRIGHT DISCLAIMER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

JavaScript® is an example of a programming language that is able to be used with a variety of platforms, and thus has become extremely popular among developers. At the same time, JavaScript® lacks certain features that developers find useful in other programming languages. For example, JavaScript® uses prototype-based object inheritance, unlike languages that have traditional object-oriented class inheritance (there are no classes in JavaScript®).

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards an object-oriented program system including a library of functions that when invoked generates a class and class members from member definitions and data. The functions include a class definition function that defines the class, and a set of class member-related functions. The set of class member-related functions may include a constructor function configured to add a constructor to the class, a properties function configured to add one or more properties to the class, an events function configured to add one or more events to the class, and a method function configured to add one or more events to the class, in which one or more of the functions are called based upon the member definitions. The object-oriented program system uses the class to instantiate an object of a prototypal object system at runtime.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards an object-oriented programming (OOP) system and library (of functions and the like) for declaring and implementing objects and object hierarchies in a prototypal programming language such as JavaScript®. Note that because JavaScript® supports inheritance through prototypes rather than classes, JavaScript® does not have classes, only object instances; thus the term "class hierarchy" when used with JavaScript® is generally inappropriate (except conceptually and indirectly).

As described herein, the OOP system enables mapping conventional object-oriented concepts such as class hierarchies, interfaces, and static methods and properties onto the JavaScript® prototypal object system. Moreover, the OOP system may be used to selectively create wrapped objects that are configured with added logic for modified runtime behavior, e.g., to perform validation and/or tracing operations, such as when specified functions, events, and/or property setters and getters are executed. In one or more implementations, the OOP system supports single inheritance and multiple interfaces (but may not support multiple inheritance). Note that static analysis tools may operate on OOP as well as on conventional JavaScript®.

It should be understood that any of the examples herein are non-limiting. For instance, JavaScript® is used as an example of one prototypal and dynamically typed programming language that benefits from the technology described herein, but the technology may apply to any such programming language. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used various ways that provide benefits and advantages in computing and programming in general.

Figure 1:
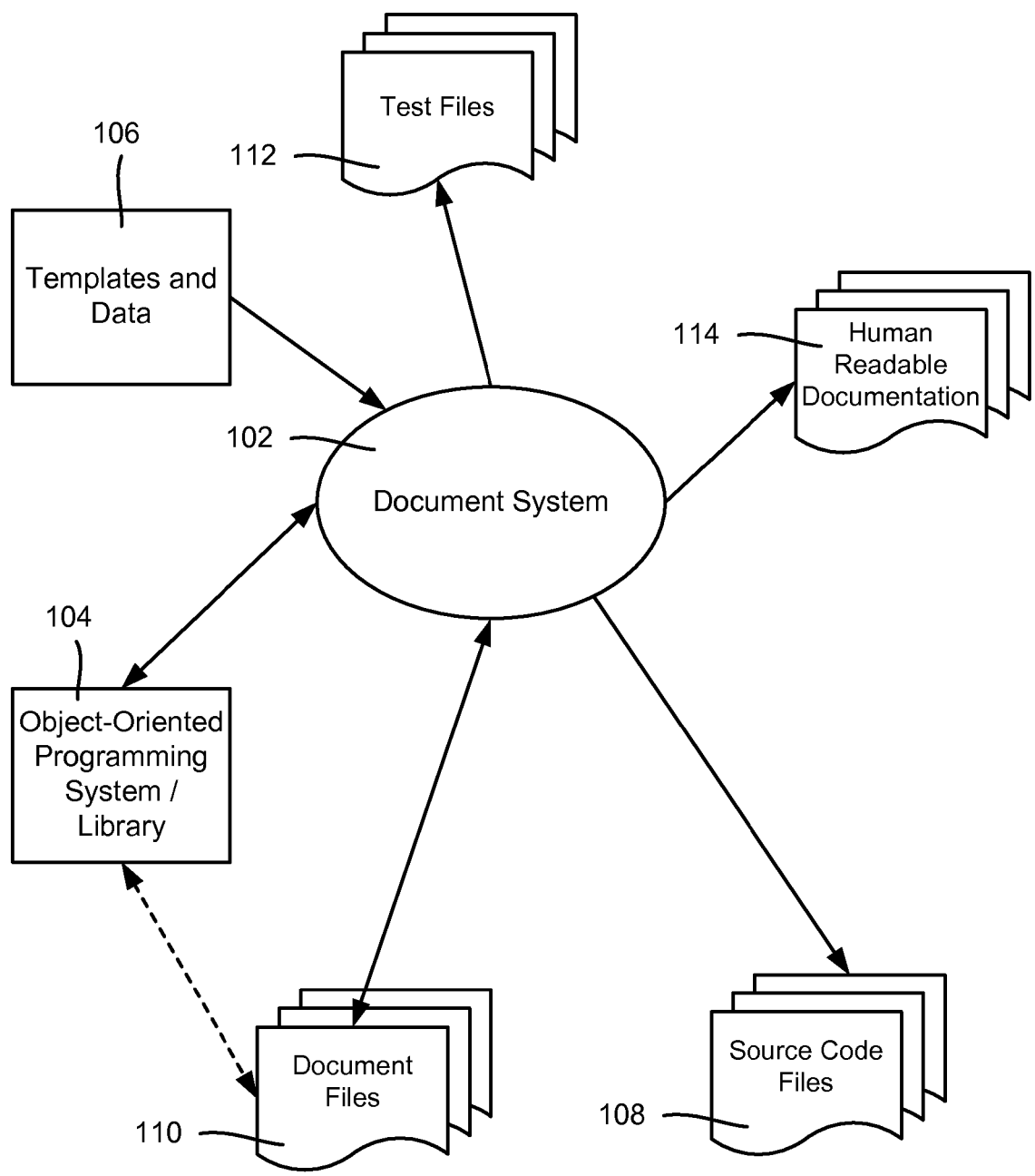
FIG. 1 is a block diagram showing example components that may be used to provide prototypal object system objects from classes via an object-oriented programming system/library, according to one or more example implementations.

FIG. 1 is a generalized, conceptual diagram showing various example components that may be used to implement aspects of the technology described herein. In FIG. 1, a document system 102 that incorporates or is coupled to an OOP system/library 104 as described herein. In one or more implementations, the document system 102 processes developer-specified templates or the like along with information provided by a developer into source code files 108, document files 110 (e.g., JavaScript Object Notation (JSON) objects)), and test files 112. The document files may be processed into documentation 114 that is more human readable than commented source code.

Figure 2:
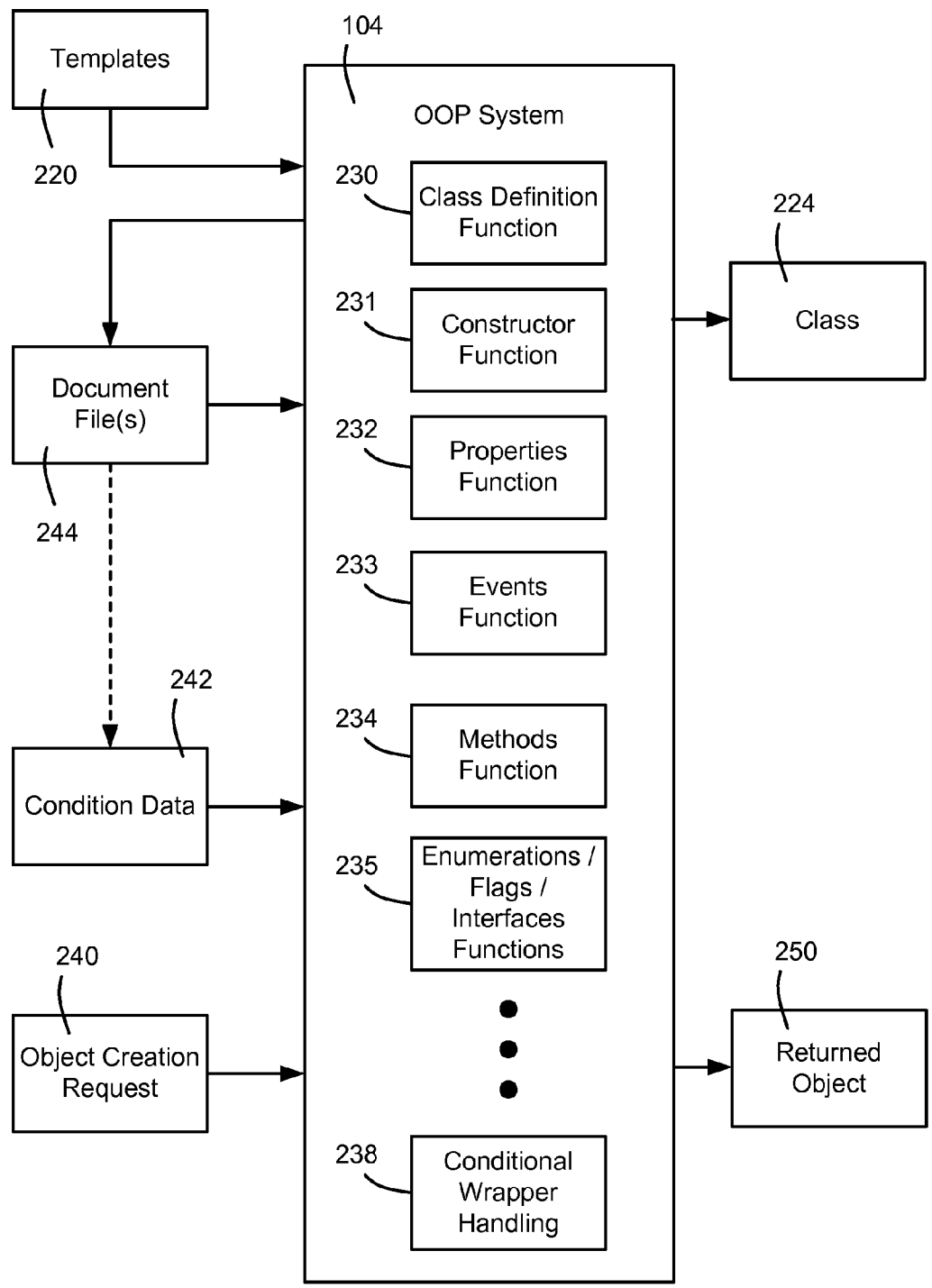
FIG. 2 is an example block diagram representing various functions and information used by an object-oriented programming system/library to generate a class and instantiate an object instance of a prototypal object system therefrom, according to one or more example implementations.

As represented in FIG. 2, the OOP system 220 includes various functions related to creating an object including creating a class representing the various parts therein, e.g., a constructor/(or singleton), properties, events, methods and so on. For example, in FIG. 2 the OOP system 220 takes in templates 222 (e.g., corresponding to class definitions) and produces a class 224, from which an object may be instantiated upon request.

To produce the class 224 representing the object, the exemplified OOP system 220 includes a library comprising various functions, including a class definition function 230, constructor function 231, properties function 232, event function 233, methods function 234 and other functions, e.g., functions 235 that support other object-oriented features such as enumerations, flags, interfaces and so on. Conditional wrapper handling code 236 for conditionally adding wrapper logic to the object as described herein also may be provided, to add wrapper logic (or not) based upon condition data 242.

For example, the OOP system supports the concept of an enumeration, comprising a set of values that are related, e.g., and may be checked during validation. As a more particular example, consider that a function gets an HTTP status code as input. As is known, this is a limited, non-contiguous set of values. During validation, the value input to a function may be checked against an enumeration containing the HTTP status codes to ensure that the input is valid.

Figure 3:
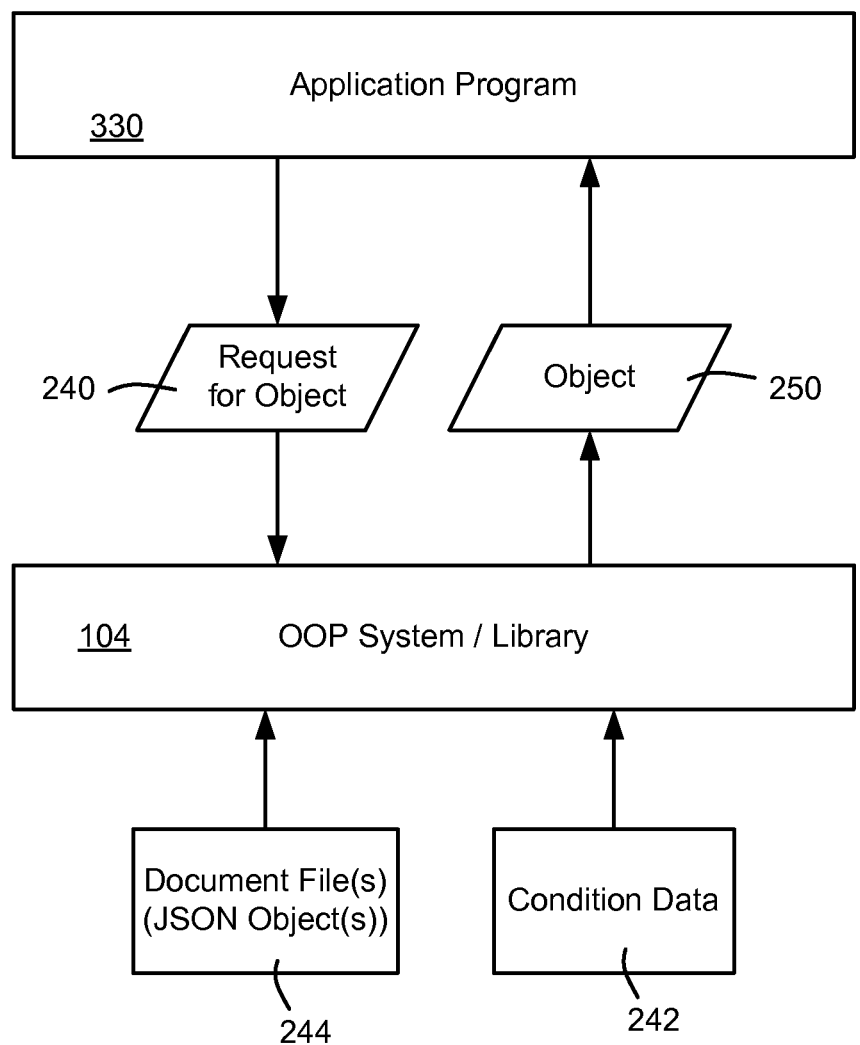
FIG. 3 is a block diagram showing example components that may be used to instantiate an object instance of a prototypal object system at runtime via an object-oriented programming system/library and class, according to one or more example implementations.

As shown in FIG. 3, at a runtime for development/testing/debugging purposes (e.g., not the production build runtime where the objects are established for each production version of the program), when an object creation request 240 (FIGS. 2 and 3) comes in to the OOP system 104 from an application program 330, the condition data 242 is used to determine whether to add conditional wrapper logic to the object, such as for validation and/or tracing. Some of the condition data 242 may be specified in the document file or files 244 associated with the object being requested, as well as the validation and tracing-related data, e.g., which validation functions to perform, how to trace and so on. Some of such information may be maintained in a separate file or other data structure associated with the object. For example, a tester may specify that all functions within an area of a program that perform some program task (e.g., handles network communication) be validated; the validation function/statements to use are identified in each function's document file(s), but the tester need only provide such information to the OOP system once (e.g., identify an object namespace that identifies the objects that handle network communication) in order to turn on validation for those functions.

In general, in creating the object, the OOP system 104/ conditional wrapper handling code 238 uses the condition data 242 to decide whether or not to wrap the object, and if wrapping is determined, how to wrap the object, such as with validation or tracing, or both. The requested object is thus returned as the returned object 250, whether wrapped or unwrapped.

Validation may be applied to functions and properties, e.g., by identifying validation functions (and/or validation code statements) in the data file(s) for an object that are invoked when validation is turned on for those object parts. Validation may include validation on OOP types and instances (derived types, interfaces implemented by that instance, etc.) and OOP events with validation on the arguments when the event fires. An OOP enumeration type may use validation that ensures the provided value is a valid enumeration value.

Figure 4:
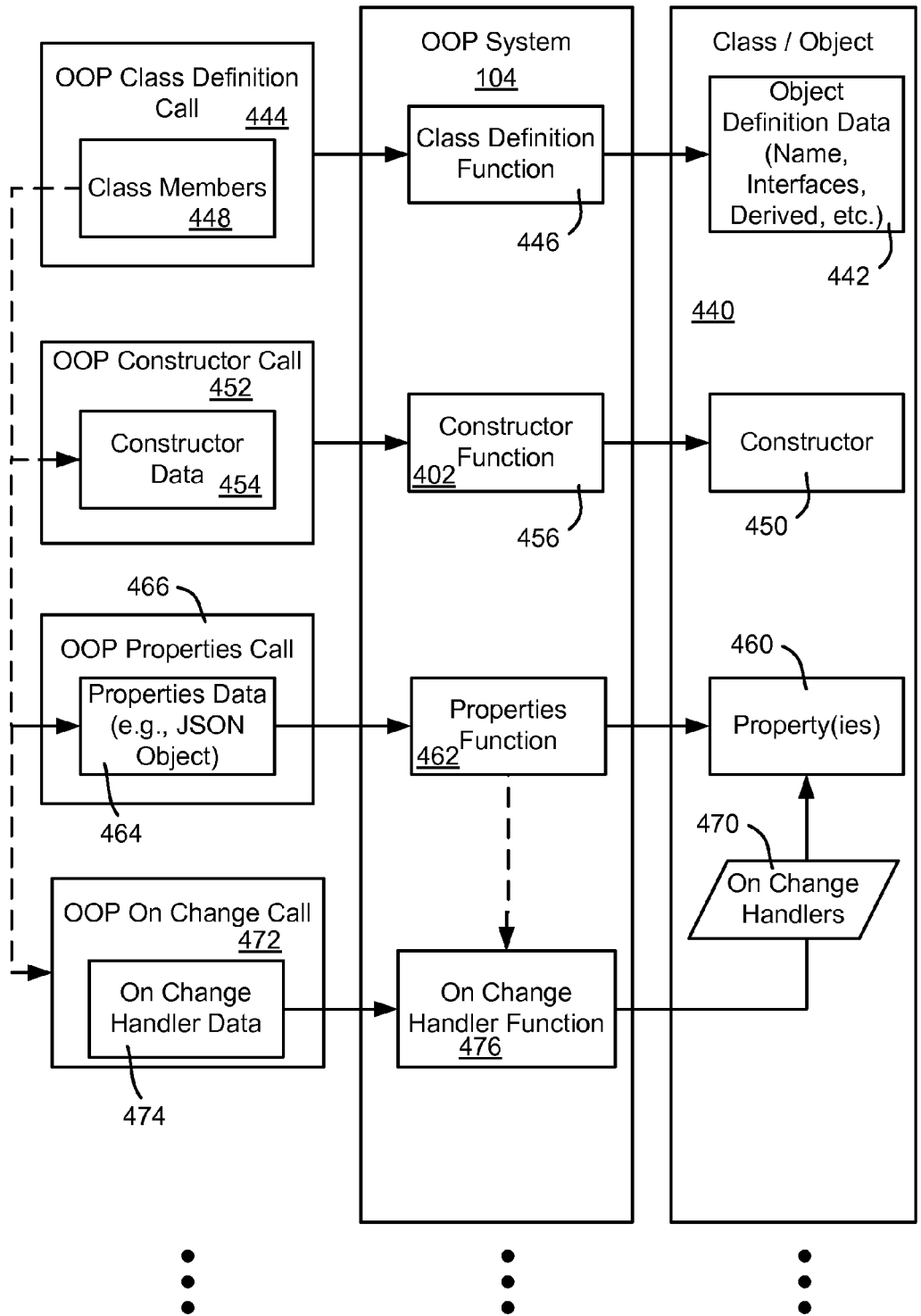
FIGS. 4 and 5 are example block diagrams representing how a class that may be used to instantiate an object instance of a prototypal object system may be generated from various function calls and related data, according to one or more example implementations.
Figure 5:
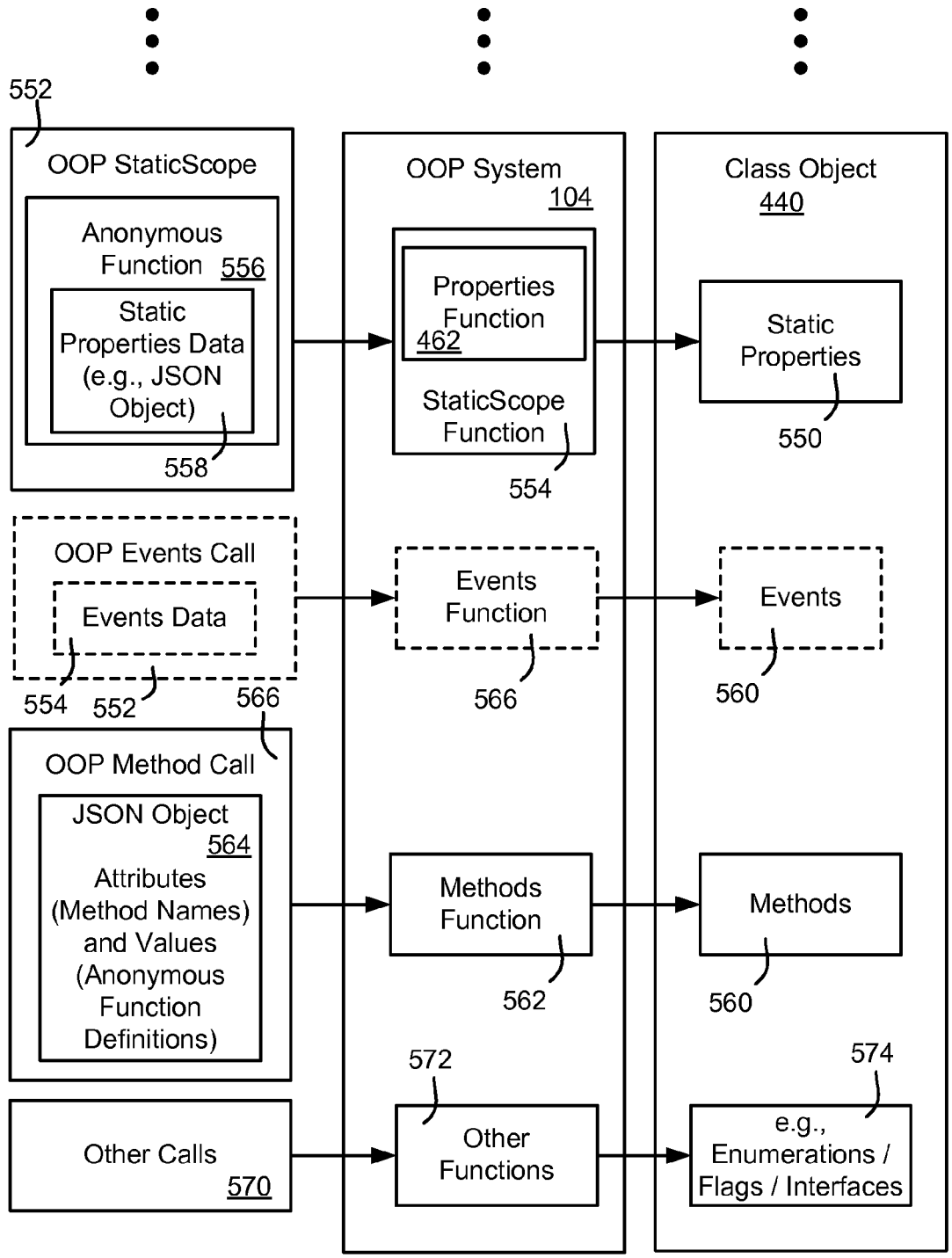

FIGS. 4 and 5 provide an example of a walkthrough of creating an OOP class, using the example set forth in the following C# class. From this C# class, the OOP system 104 provides a way to define an equivalent "class" in a JavaScript® object "class" 440.

```
class Foo
{
    public Foo( int num )
    {
        this.bar = num;
    }
    private int bar;
    static int MAX = 10;
    public void doIt( int num, string str )
    {
        Console.WriteLine( num + ": " + str );
    }
}
```

In one or more implementations of the OOP system, the entire class definition 442 is enclosed in a call 444 to the oopclassDef function 446:

```
oop.classDef( "Foo", [Object, Foo] func( ) {
    <class member definitions here>
} );
```

The func( ) { } definition, the second parameter to oop.classDef, encloses the definitions of the class members 448. These members 448 are defined by additional calls to OOP functions as described herein, generally a call for each member (e.g., a call for a constructor) or for each group of members (e.g., one call for a plurality of methods).

The constructor 450 for the class (e.g., called to instantiate the object) is defined using a call 452 with appropriate data 454 to an oop.constructor function 456. (The concept of a destructor may not be supported in one or more implementations.) Note that there is no type specified for "num" because, unlike C#, JavaScript® is a dynamically typed language.

oop.constructor(FUnction(num) {this.bar=num});

The function calls following the class creation request may be automated, at least to an extent, based upon the class member definitions. Significantly, a class can derive from another class, e.g., a base class, thereby providing class-like derivation. For derived types, the OOP system does not automatically call the base constructor for the derived type, however such an automatic call is feasible in alternative implementations.

With respect to instance properties, the "bar" property (along with any other properties) 460 in this example is defined using the oop.properties function 462:

```
oop.properties( {
    bar: undefined
} );
```

This function 462 takes a JSON object 464 (provided with the call 466) that is composed of attributes and values:

```
{
    bar: undefined
}
```

The attributes of this object specify the properties of the class, which in this example is bar, and the corresponding values specify the initial values for those properties.

The OOP system enables some useful features for oop.properties. For example, onChange handlers 470 may be attached to one or more of the properties 460. These onChange handlers 470 are functions that are called if the value of the property changes. As shown in FIG. 4, an OOP onChange function call 472 containing on change handler data 474 (e.g., the function name to invoke) may be made to a function 476 that attaches an onChange handler 470 to a property. Alternatively, the OOP system may attach an onChange handler to the object's property when the object is instantiated at runtime.

A property also may be configured to be lazily generated. That is, the value of the property is not calculated (or perhaps not retrieved from a datastore) until the property's value is accessed. A function call or the like, not shown, may be used to set this attribute of a property that specifies to the value is to be lazily calculated/retrieved and so on. Alternatively, the OOP system may add such an attribute on the object's property when the object is instantiated at runtime.

To define static properties 550 (FIG. 5), that is, properties that are associated with the class itself rather than with an instance, a call 552 to an oop.staticScope function 554 is used:

```
oop.staticScope ( function ( ) {
    oop.properties( {
        MAX: { defaultValue: 10 }
    } );
} );
```

This function 554 takes, as an argument, an anonymous function 556 that is used to create a scope for the static properties. Within this anonymous function 556, oop.properties 462 is called, passing a JSON object 558 as in the case of instance properties.

With respect to events, dashed boxes are shown in FIG. 5, because events are not provided for in this particular class example. Notwithstanding, object events 560 may be defined in a similar way, e.g., via an events call 562, having associated events-related data 564, to an events function 566.

With respect to methods 570, the exemplified dolt method (shown below) is defined using an oop.methods function 562. Similar to oop.properties, this function takes a JSON object 564 with the method function call 566, but in this case, the attributes are method names and the values of the attributes are anonymous function definitions. The OOP system 104 binds these definitions to the specified method names.

```
oop.methods ( {
    dolt: function( num, string ) {
        console.log( num + ": " + string );
    }
} );
```

Put together, the OOP "class" definition is shown below:

```
oop.classDef( "Foo", [Object, Foo] func( ) {
    oop.constructor( Function( Num ) { this.bar = Num } );
    oop.properties( {
        bar: undefined
    } );
    oop.methods ( {
        dolt: function( num, string ) {
            console.log( num + ": " + string );
        }
    } );
    oop.staticScope ( function ( ) {
        oop.properties( {
            MAX: { defaultValue: 10 }
        } );
    } );
} );
```

To create an object instance, e.g., at runtime (including loading time or during runtime), the following line may be used in one or more implementations:

var myFoo=Foo.new (5)

Note that this "method invocation" syntax enables support of OOP's aspect oriented programming (AOP) features described herein. Note further that this differs from the conventional Java invocation:

var myFoo=new Foo(5) // not used in OOP

As also shown in FIG. 5 via other calls 570 to other functions 572, other classical object oriented features are supported in one or more implementations. For example, in addition to enabling the definition of an equivalent of a class using oop.classDef, the OOP system 104 may support:

enumerations :: oop.enumDef flags :: oop.flagsDef interfaces :: oop.interfaceDef and other features, represented by block 574 in FIG. 5.

In one or more implementations, because the OOP system 104 programmatically generates JavaScript® objects, aspect oriented programming (AOP) features may be added to the OOP system 104 without changing any of the code that uses the OOP system 104. Examples include the onChange handlers and lazy properties described herein.

Tracing also may be implemented using the OOP system 104. Tracing is able to log whenever a method is called or a property's value changes, for example. In one or more implementations, the OOP code that registers a method or property consumes a logging configuration file (e.g., part of the condition data 242, FIG. 2) to determine whether it needs to generate additional tracing code for that method or property.

Similarly, the object reference documentation, in addition to documenting types, also may be used by OOP to generate code that validates the arguments passed as method parameters. For example, the OOP system 104 via the condition al wrapper handling 238 (FIG. 2) can validate that an argument passed to a particular method is of a particular type and/or that its value falls with a specified range, or matches a value in a specified enumeration. If the argument does not conform to these requirements, the validation code throws an exception. Validation also may be used to ensure that a method's return value or values conform to a set of one or more such requirements.

Figure 6A:
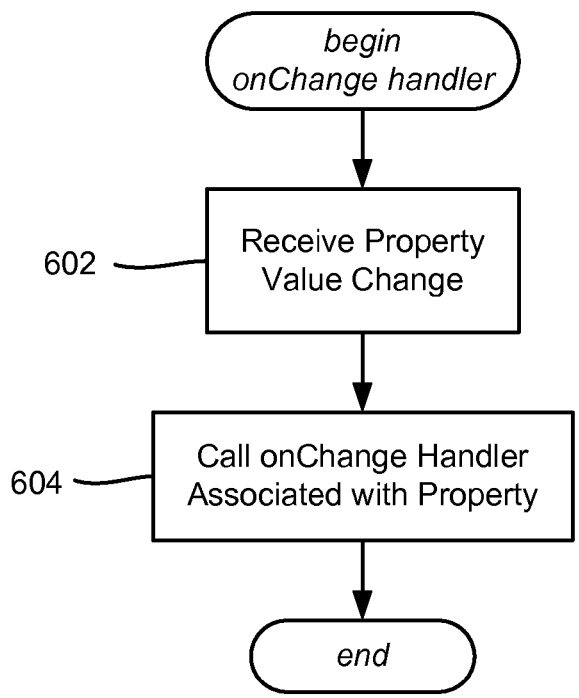
FIG. 6A is a flow diagram showing example steps that may be used to invoke an on change handler function when a property value changes, according to one or more example implementations.
Figure 6B:
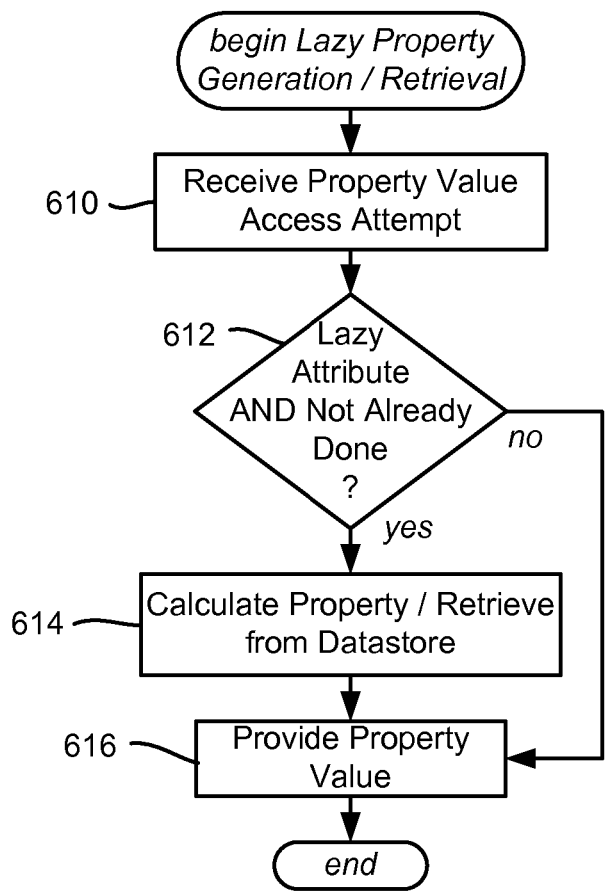
FIG. 6B is a flow diagram showing example steps that may be used to lazily generate a property value when needed based upon an attribute, according to one or more example implementations.

FIG. 6A is a flow diagram showing example steps generally directed towards the concept of an onChange handler attached to a property, beginning at step 602 where an object receives a property value change, e.g., in the object itself or via a message from another object that is also aware of the onChange handler. When this occurs, the onChange handler function associated with the changed property is invoked at step 604.

FIG. 6A is a flow diagram showing example steps generally directed towards a property being lazily generated, beginning at step 610 where an attempt is made to access an object property value, e.g., from a property getter function. As evaluated at step 612, when this occurs for a property that has the lazy generation attribute set for it (and the property has not been previously retrieved, calculated or needs to be recalculated), the property is lazily generated (e.g., created or retrieved, as appropriate) at step 614. Step 616 represents providing the property value.

Figure 7:
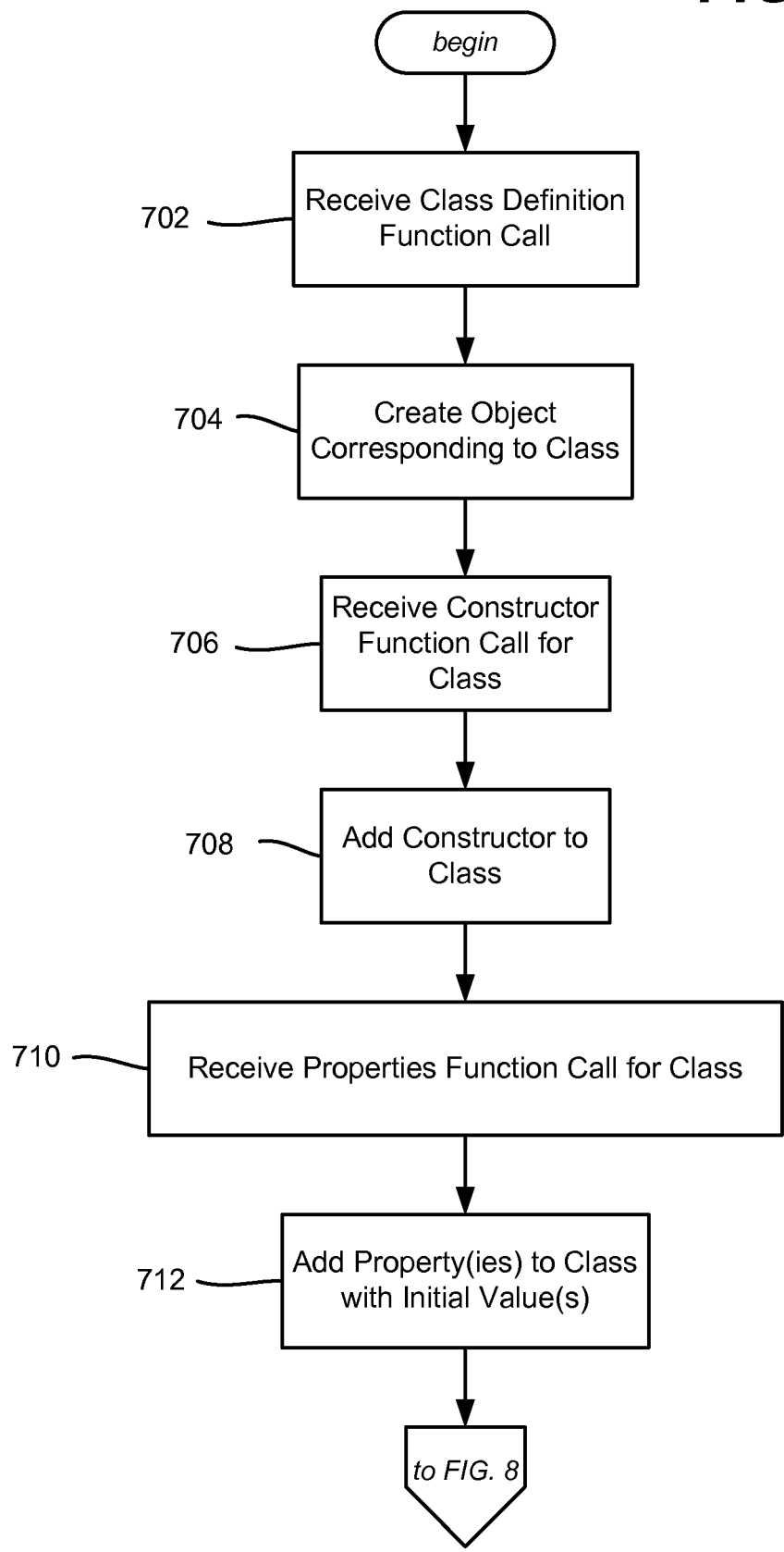
FIGS. 7 and 8 comprise a flow diagram showing example steps that may be taken to generate a class from which an object instance of a prototypal object system may be instantiated, according to one or more example implementations.
Figure 8:
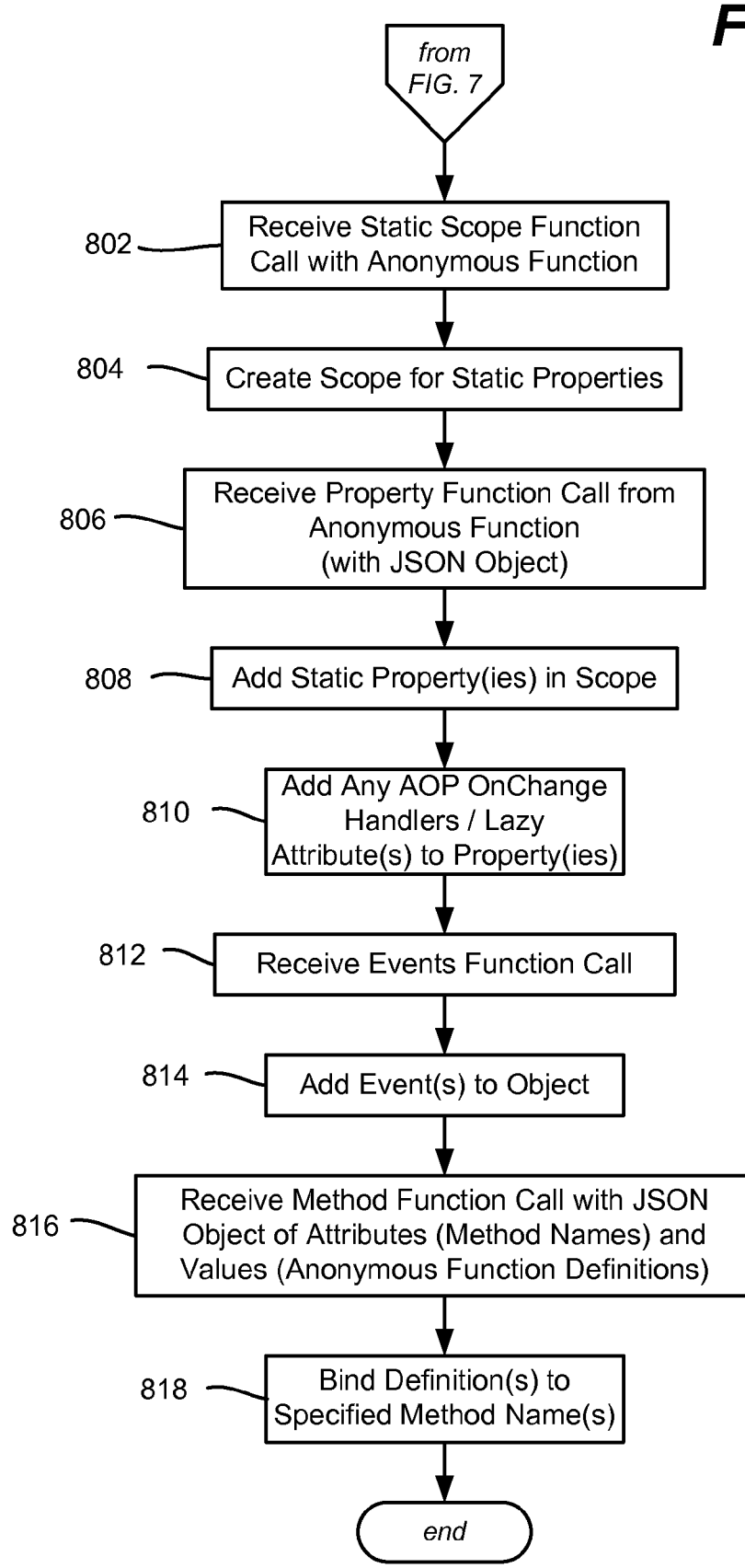

FIGS. 7 and 8 summarize a class creation via example steps that may be taken by the OOP system. Step 702 represents receiving a class definition function call, whereby step 704 creates the "class" corresponding to the object. Steps 706 and 708 are directed towards receiving the constructor function call for the class and adding the constructor to the class, respectively.

The properties function call is received at step 710, which results in step 712 adding one or more properties to the class, each with their initial value. Note that properties may be added without an initial value, e.g., if the lazy attribute is set as described below.

The process continues at step 802 of FIG. 8, which (if there are one or more static properties) represents receiving the static scope function call with an anonymous function. Step 804 creates the scope for the static property or properties. Step 806 then receives the property function call from the anonymous function, and step 808 adds the static property or properties in scope based upon the JSON Object.

Step 810 represents the concepts related to aspect oriented programming (AOP). As described herein, this may include adding OnChange handlers and/or lazy attributes to properties as desired.

Step 812 represents receive a function call for events. When received, step 814 adds one or more specified events to the class.

For functions, step 816 receives the methods function call, with a JSON object comprising the attributes (method names) and values (anonymous function definitions). Step 818 binds the definition(s) to the specified method name(s).

Figure 9:
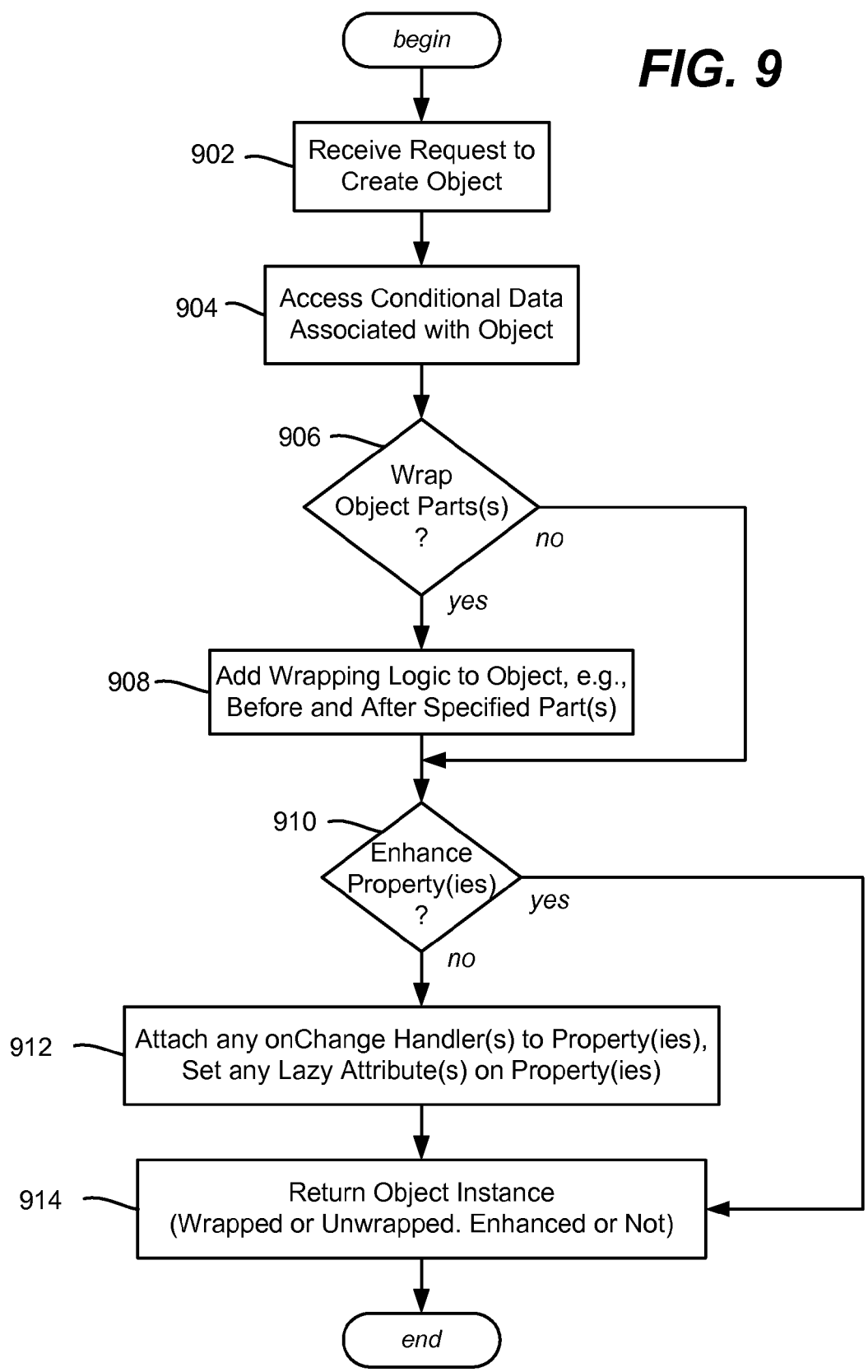
FIG. 9 is a flow diagram showing example steps that may be taken by an object-oriented programming system to instantiate an object, according to one or more example implementations.

FIG. 9 is a flow diagram having example steps directed towards creation of an object from a class at runtime (including at the start of or during runtime), beginning at step 902 where an object creation request is received. As described herein, instead of simply instantiating and returning the object instance, at step 904 the OOP system accesses conditional data that determines (step 906) if—and if so, how—the object parts are to be wrapped with additional functionality, such as for validation and/or tracing. This may include accessing the document file or files associated with the class, including for example a document file for a class from which this class derives. If wrapped, step 908 represents performing the addition of the logic, which may include before and after validation/tracing operations.

As also described herein, the OOP system may determine whether the object needs to be instantiated such that one or more properties are enhanced (step 910) with an onChange handler function and/or with a lazy property value generation attribute. Step 912 represents such enhancement. Note that this may be done in the class definition, but if not, may be done at object creation time.

Step 914 returns the object to the requesting application program or the like. Note that the unwrapped version is returned when no additional functionality is requested, so as to provide maximum performance of the object.

As can be seen, there is provided an object-oriented program system and library including functions for creating classes from templates that may be processed into JavaScript® objects, and a set of framework-specific type information that can be used, such as to provide a wrapper pattern and aspect oriented programming concepts such as onChange handlers for property changes and/or lazy property generation. At runtime for development/testing/debugging and the like, an object creation request along with conditional data results in an unwrapped or wrapped object being returned.

One or more aspects are directed towards receiving a call to create a class, the function call associated with class member definitions, and in response creating the class, and for each member or group of members associated with the call, executing a function to add one or more definitions to the class corresponding to that member or group of members. Described herein is instantiating a prototypal object based upon the class and the definitions of the class.

Executing the function to add one or more definitions to the class may include executing a constructor function to add a constructor to the class, and/or executing a properties function to add one or more properties to the class. Executing the properties function may include calling a first function to create a scope for static properties, and calling the properties function from another function to add the static properties to the class.

An on change function may be associated with a property, the on change function invoked when a value of an object property corresponding to the property of the class changes. After instantiating an object from the class at runtime, the on change function may be invoked as a result of the value of the property being changed.

An attribute may be associated with a property, the attribute indicating that a value of the property is to be lazily generated for the property of an object instantiated from the class. After instantiating an object from the class at runtime, lazy generation may include calculating or retrieving the value of the property based upon an access request for that property value.

Executing the function to add one or more definitions to the class may include executing an events function to add one or more events to the class. Executing the function to add one or more definitions to the class may include executing a methods function to add one or more methods to the class.

Also described herein is receiving a request for an object corresponding to the class and instantiating the object based upon the class. The object may be instantiated/returned with additional functionality based upon conditional data associated with the class or object. Wrapping the object with the additional functionality may include wrapping the object with validation logic and/or tracing logic, or both validation logic and tracing logic.

One or more aspects are directed towards an object-oriented program system including a library of functions that when invoked generate a class and class members from member definitions and data. The functions include a class definition function that defines the class, and a set of class member-related functions. The set of class member-related functions includes a constructor function configured to add a constructor to the class, a properties function configured to add one or more properties to the class, an events function configured to add one or more events to the class, and a method function configured to add one or more events to the class, in which one or more of the functions are called based upon the member definitions. The object-oriented program system uses the class to instantiate an object of a prototypal object system at runtime.

The object-oriented program system may be configured to instantiate and return an instance of the object with an attribute indicating that a value of a property of the object is lazily generated. The object-oriented program system may be configured to instantiate and return an instance of the object with an attribute indicating that a value of a property of the object is lazily generated. The object-oriented program system may be configured to instantiate and return an instance of the object with an on change function associated with a property, the on change function invoked when a value of the property of the object changes. The object-oriented program system may be configured to instantiate and return an instance of the object with a validation wrapper or a tracing wrapper, or both based upon condition data associated with the object or the class.

One or more aspects are directed towards instantiating a runtime object instance of a prototypal object system from a class, the class defined via functions of an object-oriented programming system. Described herein is determining whether the runtime object instance is to be wrapped with added functionality based upon condition data, and if so, returning a wrapped object instance, and if not, returning an unwrapped object instance. Also described is associating an on change handler function with a property of the object, and invoking the on change handler associated with the property if a value of the property changes.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 10 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
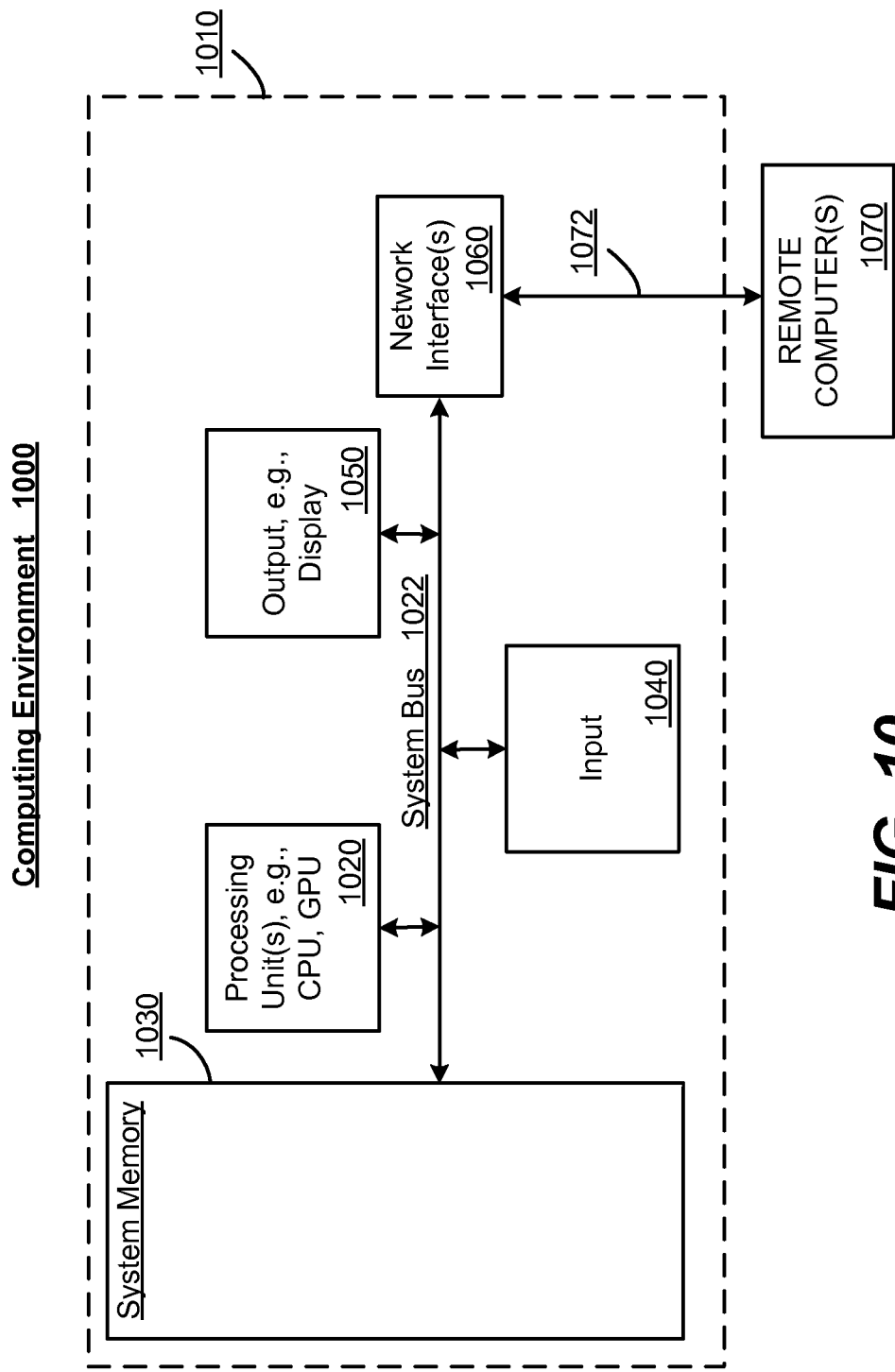
FIG. 10 is a block diagram representing an example computing environment into which aspects of the subject matter described herein may be incorporated.

FIG. 10 thus illustrates an example of a suitable computing system environment 1000 in which one or aspects of the implementations described herein can be implemented, although as made clear above, the computing system environment 1000 is only one example of a suitable computing environment and is not intended to suggest any limitation as to scope of use or functionality. In addition, the computing system environment 1000 is not intended to be interpreted as having any dependency relating to any one or combination of components illustrated in the example computing system environment 1000.

With reference to FIG. 10, an example device for implementing one or more implementations includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of machine (e.g., computer) readable media and can be any available media that can be accessed by a machine such as the computer 1010. The system memory 1030 may include computer storage media in the form of volatile and/or nonvolatile memory such as read only memory (ROM) and/or random access memory (RAM), and hard drive media, optical storage media, flash media, and so forth; as used herein, machine readable/computer readable storage media stores data that does not include transitory signals, (although other types of machine readable/computer readable media that is not storage media may). By way of example, and not limitation, system memory 1030 may also include an operating system, application programs, other program modules, and program data.

A user can enter commands and information into the computer 1010 through one or more input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:
receiving a request to create a class equivalent prototypal object definition based on an object oriented class comprising at least one class member;
generating the class equivalent prototypal object definition corresponding to the object oriented class, wherein the class equivalent prototypal object definition comprises at least one class member equivalent prototypal object definition corresponding to the at least one class member, wherein the generating the class equivalent prototypal object definition comprises generating a properties class member equivalent prototypal object definition of the at least one class member equivalent prototypal object definition corresponding to a properties class member of the at least one class member, and associating an attribute with the properties class member equivalent prototypal object definition, the attribute indicating that a value of an object property corresponding to the properties class member equivalent prototypal object definition is to be lazily generated for the object property of the instantiated prototypal object, and wherein the value of the object property that is to be lazily generated is not calculated or retrieved until the value is accessed; and
instantiating a prototypal object, based upon the class equivalent prototypal object definition.

2. The method of claim 1, wherein the generating the class equivalent prototypal object definition comprises generating a constructor class member equivalent prototypal object definition of the at least one class member equivalent prototypal object definition corresponding to a constructor class member of the at least one class member.

3. The method of claim 1, wherein the generating the properties class member equivalent prototypal object definition comprises generating a static properties member equivalent prototypal object definition of the at least one class member equivalent prototypal object definition corresponding to a static properties class member of the at least one class member.

4. The method of claim 1, further comprising, associating an on change function with the properties class member equivalent prototypal object definition, the on change function invoked when another value of an object property corresponding to the properties class member equivalent prototypal object definition changes.

5. The method of claim 4, wherein instantiating the prototypal object comprises instantiating the prototypal object at runtime and invoking the on change function as a result of the value of the object property being changed.

6. The method of claim 1, wherein instantiating the prototypal object comprises instantiating the prototypal object at runtime and calculating or retrieving the value of the object property based upon an access request for the value.

7. The method of claim 1, wherein the generating the class equivalent prototypal object definition comprises generating an events class member equivalent prototypal object definition of the at least one class member equivalent prototypal object definition corresponding to an events class member of the at least one class member.

8. The method of claim 1, wherein the generating the class equivalent prototypal object definition comprises generating a methods class member equivalent prototypal object definition of the at least one class member equivalent prototypal object definition corresponding to an methods class member of the at least one class member.

9. The method of claim 1, wherein instantiating the prototypal object comprises wrapping the prototypal object with additional functionality based upon conditional data associated with the class equivalent prototypal object definition.

10. The method of claim 9, wherein wrapping the prototypal object with the additional functionality comprises wrapping the prototypal object with at least one of validation logic or tracing logic.

11. The method of claim 10, wherein the validation logic triggers checking of a parameter value input to a function against an enumeration.

12. The method of claim 10, wherein the validation logic triggers checking of a function return value against an enumeration.

13. A system comprising:
a processor; and
a memory communicatively coupled to the processor, the memory having stored therein computer-executable instructions, comprising:
an object-oriented program component that:
generates a class equivalent prototypal object definition corresponding to an object oriented class comprising at least one class member, wherein the class equivalent prototypal object definition comprises at least one class member equivalent prototypal object definition corresponding to the at least one class member, and generates a properties class member equivalent prototypal object definition of the at least one class member equivalent prototypal object definition corresponding to a properties class member of the at least one class member;
associates an attribute with the properties class member equivalent prototypal object definition, the attribute indicating that a value of an object property corresponding to the properties class member equivalent prototypal object definition is to be lazily generated for the object property of the instantiated prototypal object, and wherein the value of the object property that is to be lazily generated is not calculated or retrieved until the value is accessed; and
instantiates a prototypal object at runtime based upon the class equivalent prototypal object definition.

14. The system of claim 13, wherein the at least one class member equivalent prototypal object definition comprises at least one of:
a constructor class member equivalent prototypal object definition corresponding to a constructor class member of the at least one class member;
a static properties member equivalent prototypal object definition corresponding to a static properties class member of the at least one class member;
an events class member equivalent prototypal object definition corresponding to an events class member of the at least one class member; or
a methods class member equivalent prototypal object definition corresponding to an methods class member of the at least one class member.

15. The system of claim 13, wherein the object-oriented program system further instantiates the prototypal object with an on change function associated with a property of the prototypal object, the on change function invoked when another value of the property of the prototypal object changes.

16. The system of claim 13, wherein the object-oriented program system further instantiates the prototypal object with at least one of a validation wrapper or a tracing wrapper based upon condition data associated with the class equivalent prototypal object definition.

17. A non-transitory computer-readable medium having instructions stored thereon that, in response to execution, cause a system including a processor to perform operations comprising:
generating a class equivalent prototypal object definition corresponding to an object oriented class comprising at least one class member, wherein the class equivalent prototypal object definition comprises at least one class member equivalent prototypal object definition corresponding to the at least one class member, wherein the generating the class equivalent prototypal object definition comprises generating a properties class member equivalent prototypal object definition of the at least one class member equivalent prototypal object definition corresponding to a properties class member of the at least one class member, and associating an attribute with the properties class member equivalent prototypal object definition, the attribute indicating that a value of an object property corresponding to the properties class member equivalent prototypal object definition is to be lazily generated for the object property of the instantiated prototypal object, and wherein the value of the object property that is to be lazily generated is not calculated or retrieved until the value is accessed; and
instantiating a prototypal object based upon the class equivalent prototypal object definition.

* * * * *